(12) United States Patent
Nito

(10) Patent No.: US 10,277,152 B2
(45) Date of Patent: Apr. 30, 2019

(54) MOTOR CONTROL APPARATUS, SHEET CONVEYING APPARATUS, IMAGE FORMING APPARATUS

(71) Applicant: CANON KABUSHIKI KAISHA, Tokyo (JP)

(72) Inventor: Yuta Nito, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/471,902

(22) Filed: Mar. 28, 2017

(65) Prior Publication Data

US 2017/0288590 A1 Oct. 5, 2017

(30) Foreign Application Priority Data

Mar. 30, 2016 (JP) ................................. 2016-069289
Feb. 27, 2017 (JP) ................................. 2017-035390

(51) Int. Cl.

| H02P 6/18 | (2016.01) |
|---|---|
| H02P 6/185 | (2016.01) |
| H02P 21/24 | (2016.01) |
| H02P 8/14 | (2006.01) |
| H02P 31/00 | (2006.01) |
| G03G 15/00 | (2006.01) |

(Continued)

(52) U.S. Cl.
CPC ............... *H02P 21/24* (2016.02); *B41J 11/42* (2013.01); *G03G 15/50* (2013.01); *G03G 15/6529* (2013.01); *H02P 8/14* (2013.01); *H02P 21/0021* (2013.01); *H02P 31/00* (2013.01); *G03G 2215/00949* (2013.01); *G03G 2215/1657* (2013.01); *Y02P 70/20* (2015.11)

(58) Field of Classification Search
CPC ............. H02P 6/18; H02P 6/185; H02P 21/24
See application file for complete search history.

(56) References Cited

U.S. PATENT DOCUMENTS

| 8,970,146 B2 | 3/2015 | Pollock | |
|---|---|---|---|
| 2003/0006723 A1* | 1/2003 | Sul ......................... | H02P 21/24 318/127 |

(Continued)

FOREIGN PATENT DOCUMENTS

| JP | 2003221161 A | 8/2003 |
|---|---|---|
| JP | 2004320847 A | 11/2004 |

(Continued)

*Primary Examiner* — Eduardo Colon Santana
*Assistant Examiner* — Cortez M Cook
(74) *Attorney, Agent, or Firm* — Canon U.S.A., Inc. IP Division

(57) ABSTRACT

A motor control apparatus operates in a first control mode in which the values of a torque current component and an excitation current component are controlled so that the difference between an instruction phase and a rotation phase is decreased and a second control mode in which constant current is supplied to a winding of a motor. The second control mode is switched to the first control mode if the rotation speed is varied from a value lower than a first threshold value to a value not lower than the first threshold value in the second control mode and the first control mode is kept even if the rotation speed is varied from a value not lower than the first threshold value to a value that is not lower than a second threshold value and that is lower than the first threshold value in the first control mode.

23 Claims, 7 Drawing Sheets

(51) Int. Cl.
*H02P 21/00* (2016.01)
*B41J 11/42* (2006.01)

(56) References Cited

U.S. PATENT DOCUMENTS

| | | | | |
|---|---|---|---|---|
| 2013/0057193 A1* | 3/2013 | Iwaji | .................. | H02P 6/185 |
| | | | | 318/721 |
| 2014/0225551 A1* | 8/2014 | Omata | .................. | H02P 23/005 |
| | | | | 318/504 |
| 2014/0361715 A1* | 12/2014 | Murata | .................. | H02P 6/18 |
| | | | | 318/400.02 |

FOREIGN PATENT DOCUMENTS

| JP | 2005-39955 A | | 2/2005 |
|---|---|---|---|
| JP | 2005039955 A | * | 2/2005 |
| JP | 2005039955 A | * | 2/2005 |
| JP | 2006081230 A | | 3/2006 |
| JP | 2008252583 A | | 10/2008 |
| JP | 2008278595 A | | 11/2008 |
| JP | 2014075931 A | | 4/2014 |

* cited by examiner

MOTOR CONTROL APPARATUS, SHEET CONVEYING APPARATUS, IMAGE FORMING APPARATUS

BACKGROUND

Field of the Disclosure

The present disclosure relates to a motor control apparatus that controls driving of a motor, a sheet conveying apparatus, and an image forming apparatus.

Description of the Related Art

As a method of controlling driving of a motor, a control method of controlling a current value in a rotating coordinate system based on a rotation phase of a rotor of the motor to control the motor has hitherto been known. Such a method is referred to as vector control. Specifically, a control method of performing phase feedback control to control a motor is known. In the phase feedback control, the current value in the rotating coordinate system is controlled so that the difference between an instruction phase of the rotor and an actual rotation phase is decreased. A control method of performing speed feedback control to control a motor is also known. In the speed feedback control, the current value in the rotating coordinate system is controlled so that the difference between an instruction speed of the rotor and an actual rotation speed is decreased.

With the vector control, driving current to be supplied to windings of a motor is capable of being divided into a current component (torque current component) to generate torque used for rotating the rotor and a current component (excitation current component) that affects the strength of a magnetic flux through the windings for control. Accordingly, even if load torque exerted on the rotor is varied, control of the value of the torque current component in accordance with the variation in the load torque enables the torque necessary for rotation to be efficiently generated. As a result, it is possible to suppress an increase in motor sound and an increase in power consumption, which are caused by excess torque. In addition, it is possible to inhibit the motor from being put into an out-of-control state (step-out state), which is caused by a situation in which the load torque exerted on the rotor exceeds output torque corresponding to the driving current supplied to the windings of the motor and the rotor is out of synchronization with an input signal.

A configuration to determine the rotation phase of a rotor is required in the vector control. U.S. Pat. No. 8,970,146 describes a configuration in which the rotation phase of a rotor is determined based on induced voltage occurring in the winding of each phase of the motor in response to the rotation of the rotor.

The magnitude of the induced voltage occurring at the winding is decreased with the decreasing rotation speed of the rotor. When the magnitude of the induced voltage occurring at the winding is not sufficient for determination of the rotation phase of the rotor, the rotation phase may not be accurately determined. In other words, the accuracy in determining the rotation phase of the rotor may be reduced with the decreasing rotation speed of the rotor.

Japanese Patent Laid-Open No. 2005-39955 describes a configuration using constant current control in which, when the rotation speed of a rotor is lower than a certain rotation speed, constant current is supplied to the windings of the motor to control the motor. In the constant current control, neither the phase feedback control nor the speed feedback control is performed. When the rotation speed of the rotor is higher than or equal to the certain rotation speed, the vector control is used in the configuration.

However, in switching of control of a motor from the constant current control to the vector control, the rotation speed of the rotor may instantaneously decrease. Specifically, even when the rotation speed of the rotor exceeds a certain rotation speed and the control of the motor is switched from the constant current control to the vector control, the rotation speed of the rotor is decreased to a value lower than the certain rotation speed and the control of the motor is switched again from the vector control to the constant current control. The switching between the constant current control and the vector control frequently occurs in the above manner. As a result, an increase and a decrease in the motor sound may repeatedly occur or the motor may be put into the out-of-control state.

In order to resolve the above problems, it is desirable to suppress repetition of switching between a first control mode and a second control mode, which are control modes for controlling a motor.

SUMMARY

The present disclosure provides a motor control apparatus that controls a motor based on an instruction phase indicating a target phase of a rotor of the motor. The motor control apparatus includes a phase determiner that determines a rotation phase of the rotor, a speed determiner that determines a rotation speed of the rotor, and a controller having a first control mode in which the value of a torque current component and the value of an excitation current component are controlled so that the difference between the instruction phase and the rotation phase determined by the phase determiner is decreased to control the motor and a second control mode in which constant current is supplied to a winding of the motor to control the motor. The torque current component is a current component having a current value represented in a rotating coordinate system based on the rotation phase, which generates torque in the rotor, and the excitation current component is a current component having a current value represented in the rotating coordinate system based on the rotation phase, which affects the strength of a magnetic flux through the winding of the motor. The controller switches a control mode to control the motor from the second control mode to the first control mode if the rotation speed of the rotor of the motor determined by the speed determiner is varied from a value lower than a first threshold value to a value higher than or equal to the first threshold value in a state in which the motor is controlled in the second control mode and keeps the first control mode even if the rotation speed of the rotor of the motor determined by the speed determiner is varied from a value higher than or equal to the first threshold value to a value that is higher than or equal to a second threshold value lower than the first threshold value and that is lower than the first threshold value in a state in which the motor is controlled in the first control mode.

Further features of the present disclosure will become apparent from the following description of exemplary embodiments with reference to the attached drawings.

DESCRIPTION OF THE EMBODIMENTS

Embodiments of the present disclosure will herein be described with reference to the attached drawings. The shapes of components described in the embodiments, the relative arrangement of the components, and so on should be appropriately modified in accordance with the configuration of an apparatus to which the present disclosure is applied and various conditions and the scope and spirit of the present disclosure are not limited to the following embodiments. Although a case is described in the following description in which a motor control apparatus is provided in an image forming apparatus, the motor control apparatus may not necessarily be provided in an image forming apparatus. For example, the motor control apparatus may also be used for a sheet conveying apparatus that conveys a sheet, such as a recording medium or an original document.

[Image Forming Apparatus]

Figure 1:
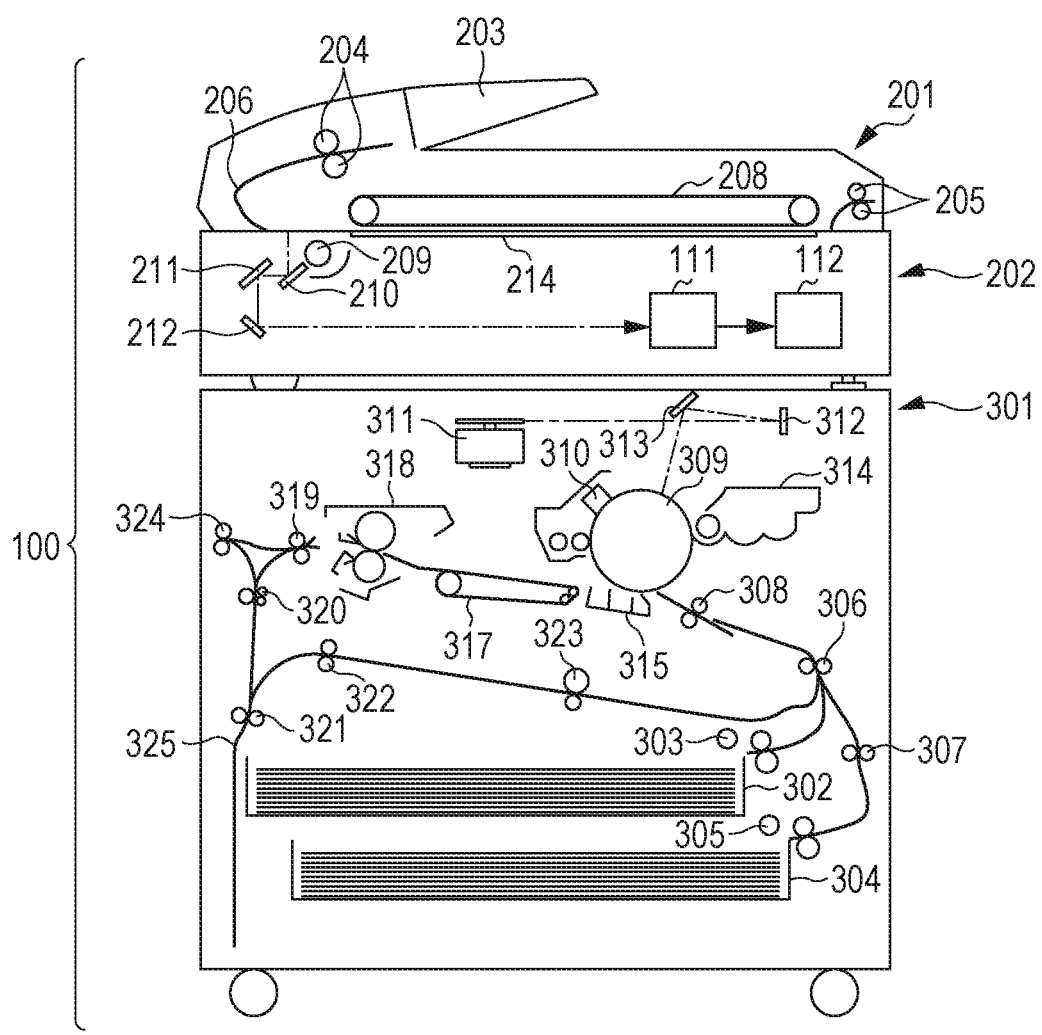
FIG. 1 is a cross-sectional view illustrating an exemplary configuration of an image forming apparatus according to an embodiment of the subject disclosure.

FIG. 1 is a cross-sectional view illustrating an exemplary configuration of an electrophotographic monochrome copy machine (hereinafter referred to as an image forming apparatus) 100 including a sheet conveying apparatus used in an embodiment. The image forming apparatus is not limited to the copy machine and may be, for example, a facsimile apparatus, a printing machine, or a printer. The recording method is not limited to the electrophotographic method and may be, for example, an inkjet method. The image forming apparatus may be of the monochrome type or a color type.

The configuration and the function of the image forming apparatus 100 will now be described with reference to FIG. 1. The image forming apparatus 100 includes a document feeding unit 201, a reading unit 202, and a main body 301 of the image forming apparatus.

An original document loaded in a document loader 203 in the document feeding unit 201 is fed by feed rollers 204 one by one and is conveyed to a glass platen 214 in the reading unit 202 along a conveying guide 206. In addition, the original document is conveyed at a constant speed along a conveying belt 208 and is discharged to a discharge tray (not illustrated) by discharge rollers 205. Light reflected from the original document illuminated with an illumination system 209 at a reading position of the reading unit 202 is led to an image reader 111 via an optical system including reflection mirrors 210, 211, and 212 and is converted into an image signal by the image reader 111. The image reader 111 is composed of, for example, a lens, a charge coupled device (CCD), which is a photoelectric conversion device, and a driving circuit for the CCD. The image signal output from the image reader 111 is subjected to various correction processes in an image processor 112 composed of a hardware device, such as an application specific integrated circuit (ASIC), and is supplied to the main body 301 of the image forming apparatus. Reading of the original document is performed in the above manner. In other words, the document feeding unit 201 and the reading unit 202 function as a document reading apparatus.

The original document is read in two reading modes: a first reading mode and a second reading mode. In the first reading mode, an image of the original document conveyed at a constant speed is captured with the illumination system 209 and the optical system, which are fixed at certain positions. In the second reading mode, an image of the original document displaced on the glass platen 214 in the reading unit 202 is captured with the illumination system 209 and the optical system, which move at a constant speed. An image of a sheet-type original document is normally read in the first reading mode and an image of a bound original document, such as a book or a booklet, is normally read in the second reading mode.

Sheet storage trays 302 and 304 are provided in the main body 301 of the image forming apparatus. Recording media of different kinds may be stored in the sheet storage trays 302 and 304. For example, A4-size sheets of plain paper are stored in the sheet storage tray 302 and A4-size sheets of thick paper are stored in the sheet storage tray 304. An image is formed on the recording medium by the image forming apparatus. The recording medium is, for example, a sheet of paper, a resin sheet, a cloth, an overhead projector (OHP) sheet, or a label.

Each recording medium stored in the sheet storage tray 302 is fed by a feed roller 303 and is supplied to registration rollers 308 by conveying rollers 306. Each recording medium stored in the sheet storage tray 304 is fed by a feed roller 305 and is supplied to the registration rollers 308 by conveying rollers 307 and the conveying rollers 306.

The image signal output from the reading unit 202 is input into an optical scanning unit 311 including a semiconductor laser and a polygon mirror. The outer peripheral surface of a photoconductive drum 309 is charged with a charger 310. After the outer peripheral surface of the photoconductive drum 309 is charged, the outer peripheral surface of the photoconductive drum 309 is irradiated with laser light which corresponds to the image signal supplied from the reading unit 202 to the optical scanning unit 311 and which is emitted from the optical scanning unit 311 to the outer peripheral surface of the photoconductive drum 309 via the polygon mirror and mirrors 312 and 313. As a result, an electrostatic latent image is formed on the outer peripheral surface of the photoconductive drum 309. A charging method using, for example, a corona charger or charging rollers is used to charge the photoconductive drum.

Then, the electrostatic latent image is developed with toner in a developer unit 314 and a toner image is formed on the outer peripheral surface of the photoconductive drum 309. The toner image formed on the photoconductive drum 309 is transferred to the recording medium with a transfer charger 315 provided at a position (transfer position) opposing the photoconductive drum 309. At this time, the recording medium is fed to the transfer position in time with the toner image by the registration rollers 308.

The recording medium on which the toner image is transferred in the above manner is fed to a fixing unit 318 along a conveying belt 317 and is subjected to application of heat and pressure in the fixing unit 318 to fix the toner image on the recording medium. An image is formed on the recording medium by the image forming apparatus 100 in the above manner.

In the image formation in one-side printing, the recording medium that has passed through the fixing unit 318 is discharged to the discharge tray (not illustrated) by discharge rollers 319 and 324. In the image formation in duplex printing, a first side of the recording medium is subjected to a fixing process with the fixing unit 318 and the recording medium is conveyed to a reversing path 325 by the discharge rollers 319, conveying rollers 320, and reversing rollers 321. Then, the recording medium is conveyed again to the registration rollers 308 by conveying rollers 322 and 323 and an image is formed on a second side of the recording medium using the method described above. Then, the recording medium is discharged to the discharge tray (not illustrated) by the discharge rollers 319 and 324.

When the recording medium having an image formed on its first side is to be discharged to the outside of the image forming apparatus 100 in a face-down state, the recording medium that has passed through the fixing unit 318 is conveyed in a direction toward the conveying rollers 320 via the discharge rollers 319. Then, the rotation of the conveying rollers 320 is reversed immediately before the posterior end of the recording medium passes through a nip portion of the conveying rollers 320 and the recording medium is discharged to the outside of the image forming apparatus 100 via the discharge roller 324 in a state in which the first side of the recording medium is faced down.

The configuration and the function of the image forming apparatus 100 have been described above. Loads in the present disclosure are targets to be driven by a motor. For example, the various rollers (conveying rollers), such as the feed rollers 204, 303, and 305, the registration rollers 308, and the discharge rollers 319, the photoconductive drum 309, the conveying belts 208 and 317, the illumination system 209, and the optical system correspond to the loads in the present disclosure. The motor control apparatus in the present embodiment is applied to a motor that drives the loads.

Figure 2:
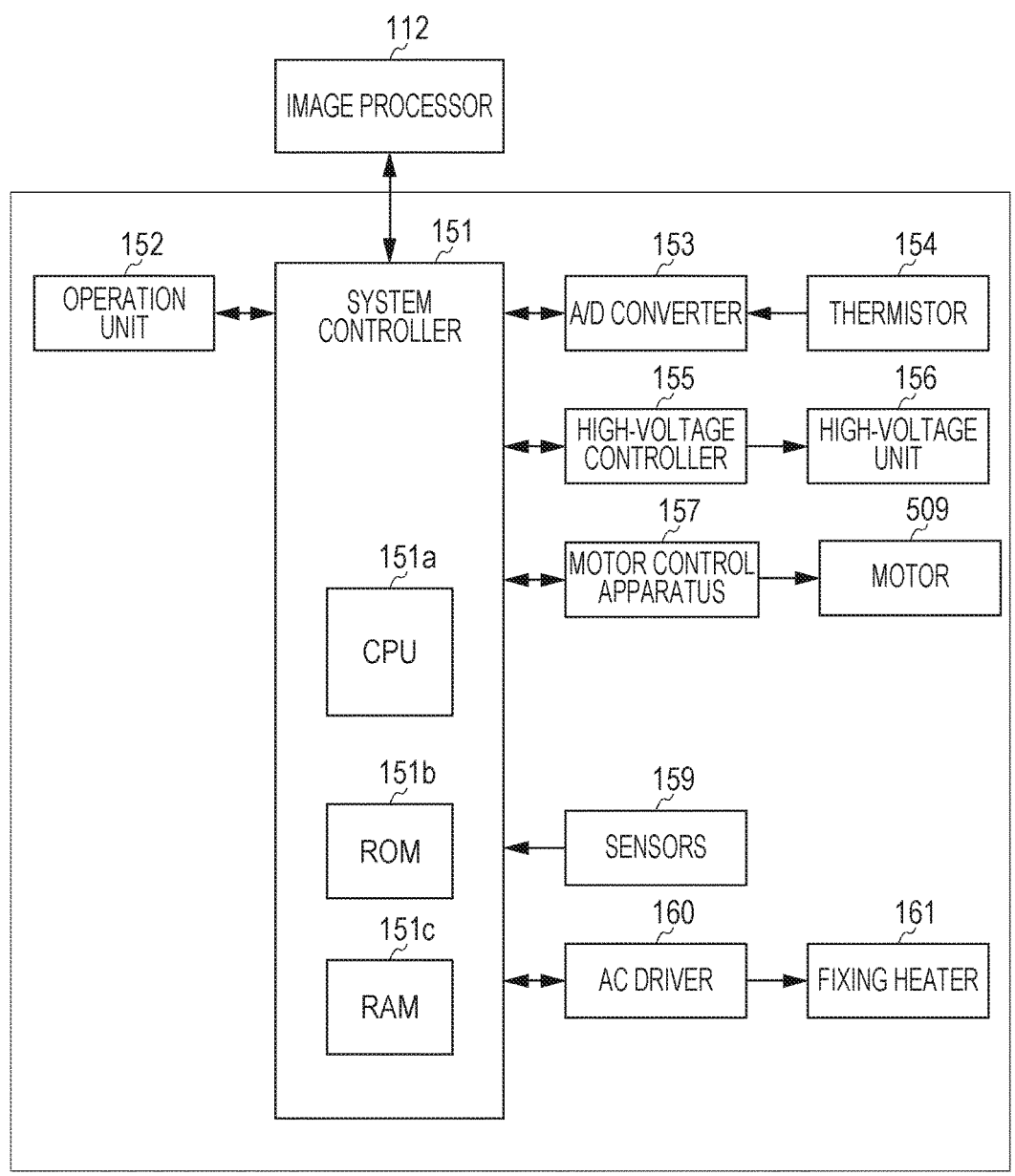
FIG. 2 is a block diagram illustrating an exemplary control configuration of the image forming apparatus according to an embodiment of the subject disclosure.

FIG. 2 is a block diagram illustrating an exemplary control configuration of the image forming apparatus 100. Referring to FIG. 2, a system controller 151 includes a central processing unit (CPU) 151a, a read only memory (ROM) 151b, and a random access memory (RAM) 151c. The system controller 151 is connected to an image processor 112, an operation unit 152, an analog-to-digital (A/D) converter 153, a high-voltage controller 155, a motor control apparatus 157, sensors 159, and an alternating-current current (AC) driver 160. The system controller 151 is capable of transmitting and receiving data and commands to and from the units connected to the system controller 151.

The CPU 151a reads out various programs stored in the ROM 151b and executes the programs to perform various sequences related to a predetermined image forming sequence.

The RAM 151c is a storage device. A variety of data including a setting value for the high-voltage controller 155, an instruction value for the motor control apparatus 157, and information received from the operation unit 152 is stored in the RAM 151c.

The system controller 151 transmits setting value data for the various units provided in the image forming apparatus 100 to the image processor 112. The setting value data is necessary for the image processing in the image processor 112. In addition, the system controller 151 receives signals from the various units (for example, signals from the sensors 159) and sets the setting value for the high-voltage controller 155 based on the received signals. The high-voltage controller 155 supplies voltage necessary for a high-voltage unit 156 (the charger 310, the developer unit 314, the transfer charger 315, and so on) in accordance with the setting value set by the system controller 151. The sensors 159 include a sensor that detects the recording medium conveyed by the conveying rollers.

The motor control apparatus 157 controls a motor 509 in accordance with an instruction supplied from the CPU 151a. Although only the motor 509 is illustrated as a motor that drives the loads in FIG. 2, multiple motors are practically provided in the image forming apparatus. A configuration may be used in which one motor control apparatus controls the multiple motors. Although only one motor control apparatus is provided in the image forming apparatus in FIG. 2, multiple motor control apparatuses are practically provided in the image forming apparatus.

The A/D converter 153 receives a detection signal detected by a thermistor 154 for detecting the temperature of a fixing heater 161, converts the detection signal from an analog signal to a digital signal, and transmits the digital signal to the system controller 151. The system controller 151 controls the AC driver 160 based on the digital signal received from the A/D converter 153. The AC driver 160 controls the fixing heater 161 so that the fixing heater 161 has a temperature necessary to perform the fixing process. The fixing heater 161 is a heater used for the fixing process and is included in the fixing unit 318.

The system controller 151 controls the operation unit 152 so that an operation screen used by a user to set, for example, the type of the recording medium that is used (hereinafter referred to as a sheet type) is displayed in a display provided in the operation unit 152. The system controller 151 receives information set by the user from the operation unit 152 and controls an operational sequence of the image forming apparatus 100 based on the information set by the user. The system controller 151 transmits information indicating the state of the image forming apparatus to the operation unit 152. The information indicating the state of the image forming apparatus is information indicating, for example, the number of images to be formed, whether the image formation is being performed, whether a jam has occurred, and where the jam has occurred. The operation unit 152 displays the information received from the system controller 151 in the display.

The system controller 151 controls the operational sequence of the image forming apparatus 100 in the above manner.

[Vector Control]

The motor control apparatus in the present embodiment will now be described. The motor control apparatus in the present embodiment is capable of controlling a motor using either of two control methods: vector control and constant current control. It is assumed here that the motor in the present embodiment does not include a sensor, such as a rotary encoder, for detecting a rotation phase of the rotor of the motor.

How the motor control apparatus 157 in the present embodiment performs the vector control will now be described with reference to FIG. 3 and FIG. 4.

Figure 3:
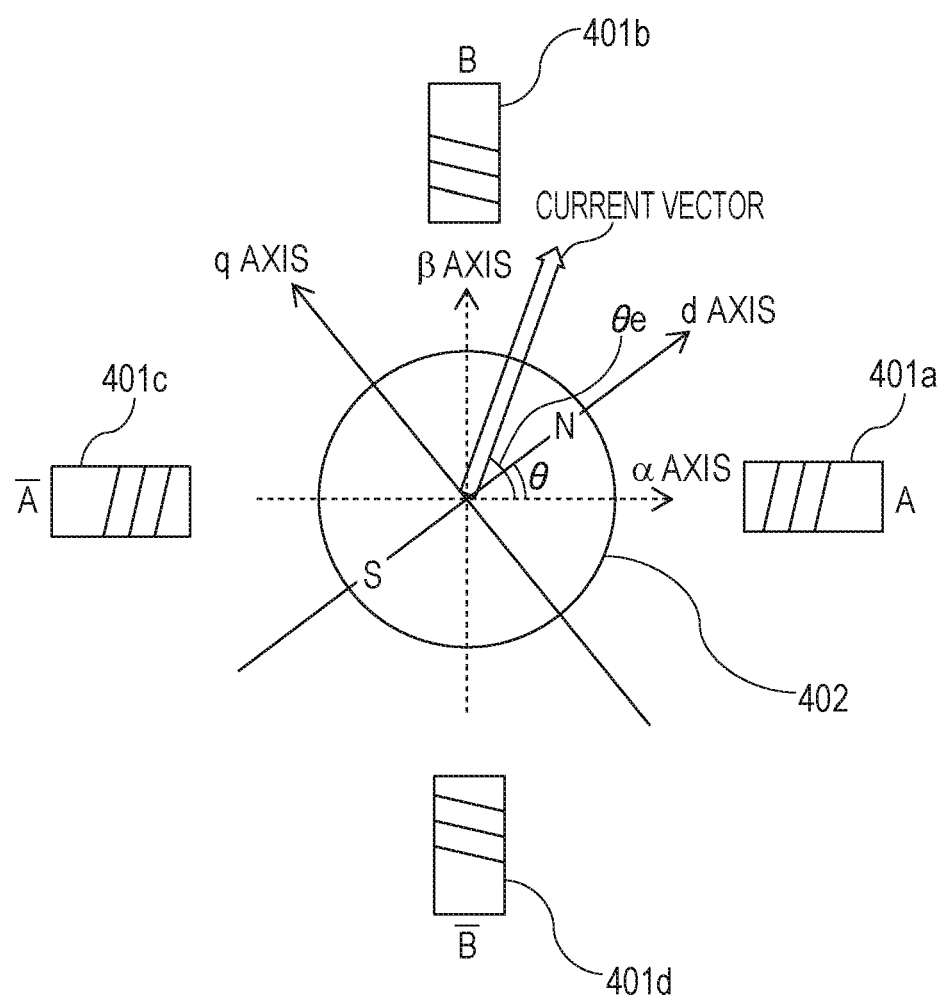
FIG. 3 is a diagram illustrating the relationship between a motor having two phases: an A phase and a B phase and a d axis and a q axis of a rotating coordinate system relating to an embodiment of the subject disclosure.

FIG. 3 is a diagram illustrating the relationship between the stepping motor (hereinafter referred to as the motor) 509 having two phases: an A phase (first phase) and a B phase (second phase) and a rotating coordinate system represented by a d axis and a q axis. Referring to FIG. 3, an α axis corresponding to the winding of the A phase and a β axis corresponding to the winding of the B phase are defined in a stationary coordinate system. The d axis is defined along the direction of a magnetic flux formed by a magnetic pole of a permanent magnet used for a rotor 402 and the q axis is defined along a direction proceeding counterclockwise from the d axis by 90 degrees (direction orthogonal to the d axis) in FIG. 3. The angle formed by the α axis and the d axis is defined as θ and the rotation phase of the rotor 402 is represented by the angle θ. In the vector control, the rotating coordinate system based on the rotation phase θ of the rotor 402 is used. Specifically, in the vector control, the value of a q-axis component (torque current component) to generate torque in the rotor and the value of a d-axis component (excitation current component) affecting the strength of a magnetic flux through the windings are used. The q-axis component (torque current component) and the d-axis component (excitation current component) are current components of current vector corresponding to driving current flowing through the windings in the rotating coordinate system.

The vector control is a control method of performing phase feedback control in which the value of the torque current component and the value of the excitation current component are controlled so that the difference between an instruction phase indicating a target phase of the rotor and an actual rotation phase is decreased to control the motor. In order to control the motor, speed feedback control may be performed in which the value of the torque current component and the value of the excitation current component are controlled so that the difference between an instruction speed indicating a target speed of the rotor and an actual rotation speed is decreased.

Figure 4:
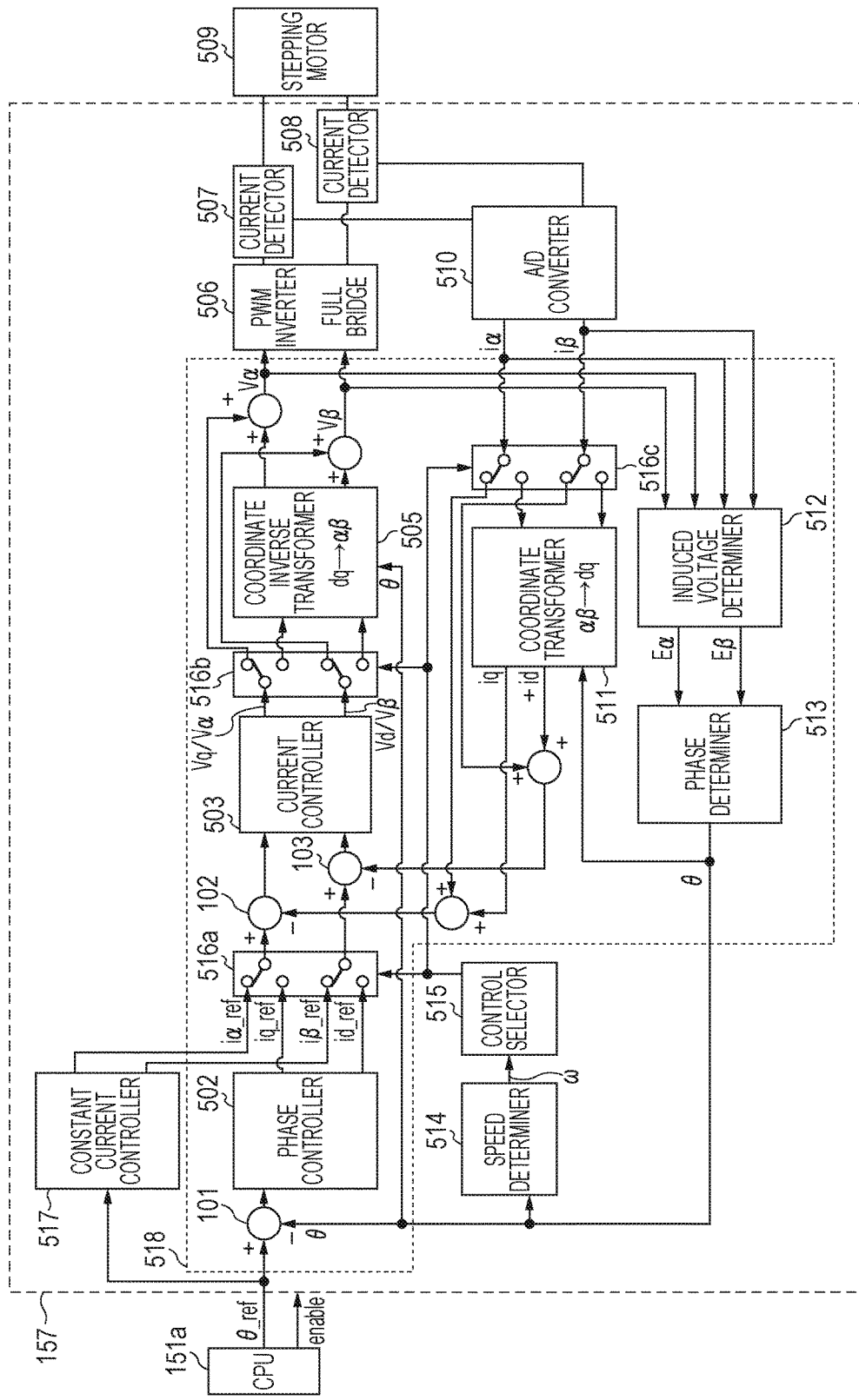
FIG. 4 is a block diagram illustrating an exemplary configuration of a motor control apparatus according to an embodiment of the subject disclosure.

FIG. 4 is a block diagram illustrating an exemplary configuration of the motor control apparatus 157 controlling the motor 509.

Referring to FIG. 4, the motor control apparatus 157 includes a constant current controller 517 performing the constant current control and a vector controller 518 performing the vector control. The motor control apparatus 157 also includes components used to switch between control of the driving of the motor 509 using the constant current controller 517 and control of the driving of the motor 509 using the vector controller 518 based on the rotation speed of the rotor 402. Specifically, the motor control apparatus 157 includes a speed determiner 514, a control selector 515, and control selector switches 516a, 516b, and 516c (hereinafter referred to as switches).

The motor control apparatus 157 includes, for example, a phase controller 502, a current controller 503, a coordinate inverse transformer 505, a coordinate transformer 511, and a pulse width modulation (PWM) inverter 506 that supplies the driving current to the windings of the motor, as a circuit for the vector control. The coordinate transformer 511 performs coordinate conversion of the current vector corresponding to the driving current flowing through the windings of the A phase and the B phase of the motor 509 from the stationary coordinate system represented by the α axis and the β axis to the rotating coordinate system represented by the q axis and the d axis. As a result, the driving current flowing through the windings is represented by the current value of the q-axis component (q-axis current) and the current value of the d-axis component (d-axis current), which are the current values in the rotating coordinate system. The q-axis current corresponds to torque current to generate torque in the rotor 402 of the motor 509. The d-axis current corresponds to excitation current affecting the strength of the magnetic flux through the windings of the motor 509 and does not contribute to the generation of torque in the rotor 402. The motor control apparatus 157 is capable of independently controlling the q-axis current and the d-axis current. As a result, the motor control apparatus 157 is capable of efficiently generating the torque necessary to rotate the rotor 402.

The motor control apparatus 157 determines the rotation phase θ of the rotor 402 of the motor 509 using a method described below and performs the vector control based on the result of the determination. The CPU 151a generates an instruction phase θ_ref indicating the target phase of the rotor 402 of the motor 509 and supplies the generated instruction phase θ_ref to the motor control apparatus 157 with a predetermined time period.

A subtractor 101 calculates the difference between the rotation phase θ and the instruction phase θ_ref of the rotor 402 of the motor 509 and supplies the calculated difference to the phase controller 502.

The phase controller 502 generates a q-axis current instruction value iq_ref and a d-axis current instruction value id_ref so that the difference supplied from the subtractor 101 is decreased based on proportional control (P), integral control (I), and differential control (D) and outputs the generated q-axis current instruction value iq_ref and d-axis current instruction value id_ref. Specifically, the phase controller 502 generates the q-axis current instruction value iq_ref and the d-axis current instruction value id_ref so that the difference supplied from the subtractor 101 is equal to zero based on the P control, the I control, and the D control and outputs the generated q-axis current instruction value iq_ref and d-axis current instruction value id_ref. The P control is a control method of controlling the value of a target to be controlled based on a value proportional to the difference between the instruction value and an estimated value. The I control is a control method of controlling the value of a target to be controlled based on a value proportional to time integral of the difference between the instruction value and the estimated value. The D control is a control method of controlling the value of a target to be controlled based on a value proportional to variation in time of the difference between the instruction value and the estimated value. Although the phase controller 502 in the present embodiment generates the q-axis current instruction value iq_ref and the d-axis current instruction value id_ref based on the PID control, the generation of the q-axis current instruction value iq_ref and the d-axis current instruction value id_ref is not limitedly based on the PID control. For example, the phase controller 502 may generate the q-axis current instruction value iq_ref and the d-axis current instruction value id_ref based on PI control. Although the d-axis current instruction value id_ref affecting the strength of the magnetic flux through the windings is normally set to zero when a permanent magnet is used for the rotor 402, the value of the d-axis current instruction value id_ref is not limited to zero.

The driving current flowing through the windings of the A phase and the B phase of the motor 509 is detected with current detectors 507 and 508 and, then, is converted from an analog value to a digital value by an A/D converter 510.

The current value of the driving current, which is converted from an analog value to a digital value by the A/D converter 510, is represented as current values iα and iβ in the stationary coordinate system according to Equations (1)

and (2) using a phase θe of the current vector illustrated in FIG. 3. The phase θe of the current vector is defined as an angle formed by the α axis and the current vector. In Equations (1) and (2), I denotes the magnitude of the current vector.

$$i\alpha = I^* \cos \theta e \qquad (1)$$

$$i\beta = I^* \sin \theta e \qquad (2)$$

The current values iα and iβ are supplied to the coordinate transformer 511 and an induced voltage determiner 512.

The coordinate transformer 511 performs the coordinate conversion of the current values iα and iβ into a d-axis current value id and a q-axis current value iq in the rotating coordinate system according to Equations (3) and (4):

$$id = \cos \theta i\alpha + \sin \theta^* i\beta \qquad (3)$$

$$iq = -\sin \theta^* i\alpha + \cos \theta^* i\beta \qquad (4)$$

The q-axis current instruction value iq_ref supplied from the phase controller 502 and the q-axis current value iq supplied from the coordinate transformer 511 are input into a subtractor 102. The subtractor 102 calculates the difference between the q-axis current instruction value iq_ref and the q-axis current value iq and supplies the calculated difference to the current controller 503.

The d-axis current instruction value id_ref supplied from the phase controller 502 and the d-axis current value id supplied from the coordinate transformer 511 are input into a subtractor 103. The subtractor 103 calculates the difference between the d-axis current instruction value id_ref and the d-axis current value id and supplies the calculated difference to the current controller 503.

The current controller 503 generates driving voltage Vq and driving voltage Vd so that each of the differences is decreased based on the PID control. Specifically, the current controller 503 generates the driving voltage Vq and the driving voltage Vd so that each of the differences is decreased to zero and supplies the generated driving voltage Vq and driving voltage Vd to the coordinate inverse transformer 505. In other words, the current controller 503 functions as a generator. Although the current controller 503 in the present embodiment generates the driving voltage Vq and the driving voltage Vd based on the PID control, the generation of the driving voltage Vq and the driving voltage Vd is not limitedly based on the PID control. For example, the current controller 503 may generate the driving voltage Vq and the driving voltage Vd based on the PI control.

The coordinate inverse transformer 505 performs inverse transform of the driving voltage Vq and the driving voltage Vd in the rotating coordinate system, which are supplied from the current controller 503, into driving voltage Vα and driving voltage Vβ in the stationary coordinate system according to Equations (5) and (6):

$$V\alpha = \cos \theta^* Vd - \sin \theta^* Vq \qquad (5)$$

$$V\beta = \sin \theta^* Vd + \cos \theta^* Vq \qquad (6)$$

After the inverse transform of the driving voltage Vg and the driving voltage Vd in the rotating coordinate system into the driving voltage Vα and the driving voltage Vβ in the stationary coordinate system, the coordinate inverse transformer 505 supplies the driving voltage Vα and the driving voltage Vβ to the induced voltage determiner 512 and the PWM inverter 506.

The PWM inverter 506 includes a full-bridge circuit. The full-bridge circuit is driven with a PWM signal based on the driving voltage Vα and the driving voltage Vβ supplied from the coordinate inverse transformer 505. As a result, the PWM inverter 506 generates driving current iα and driving current iβ corresponding to the driving voltage Vα and the driving voltage Vβ, respectively, and supplies the driving current iα and the driving current iβ to the windings of the respective phases of the motor 509 to drive the motor 509. In other words, the PWM inverter 506 functions as a current provider that supplies the current to the winding of each phase of the motor 509. Although the PWM inverter includes the full-bridge circuit in the present embodiment, the PWM inverter may include a half-bridge circuit or the like.

How to determine the rotation phase θ will now be described. The values of induced voltage Eα and induced voltage Eβ induced in the windings of the A phase and the B phase, respectively, of the motor 509 in response to the rotation of the rotor 402 are used to determine the rotation phase θ of the rotor 402. The values of the induced voltages are determined (calculated) by the induced voltage determiner 512. Specifically, the induced voltages Eα and Eβ are determined from the current values iα and iβ supplied from the A/D converter 510 to the induced voltage determiner 512 and the driving voltages Vα and Vβ supplied from the coordinate inverse transformer 505 to the induced voltage determiner 512 according to Equations (7) and (8):

$$E\alpha = V\alpha - R^* i\alpha - L^* di\alpha/dt \qquad (7)$$

$$E\beta = V\beta - R^* i\beta - L^* di\beta/dt \qquad (8)$$

In Equations (7) and (8), R denotes winding resistance and L denotes winding inductance. The values of R and L are specific to the motor 509 that is used and are stored in advance in the ROM 151b or in a memory (not illustrated) provided in the motor control apparatus 157.

The induced voltages Eα and Eβ determined by the induced voltage determiner 512 are supplied to a phase determiner 513.

The phase determiner 513 determines the rotation phase θ of the rotor 402 of the motor 509 according to Equation (9) based on the ratio between the induced voltage Eα and the induced voltage Eβ, which are supplied from the induced voltage determiner 512.

$$\theta = \tan^{-1}(-E\beta/E\alpha) \qquad (9)$$

Although the phase determiner 513 determines the rotation phase θ through the calculation according to Equation (9) in the present embodiment, the determination of the rotation phase θ is not limited to this. For example, the phase determiner 513 may determine the rotation phase θ by referring to a table indicating the relationship between the induced voltage Eα and the induced voltage Eβ and the rotation phase θ corresponding to the induced voltage Eα and the induced voltage Eβ, which is stored in the ROM 151b or the like.

The rotation phase θ of the rotor 402 determined in the above manner is supplied to the subtractor 101, the speed determiner 514, the coordinate inverse transformer 505, and the coordinate transformer 511.

The motor control apparatus 157 repeats the above control when the motor control apparatus 157 performs the vector control.

As described above, the motor control apparatus 157 in the present embodiment performs the vector control using the phase feedback control in which the current values in the rotating coordinate system are controlled so that the difference between the instruction phase θ_ref and the rotation phase θ is decreased. Performing the vector control inhibits the motor from being put into the step-out state and suppresses an increase in motor sound and an increase in power consumption, which are caused by excess torque. Performing the phase feedback control enables the rotation phase of the rotor to be controlled so that the rotor has a desired rotation phase. Accordingly, application of the vector control using the phase feedback control to the motor that drives the loads (for example, the registration rollers) required to accurately control the rotation phase of the rotor in the image forming apparatus enables the image formation on the recording medium to be appropriately performed.

[Constant Current Control]

The constant current control will now be described with reference to FIG. 4. The constant current control is a control method of supplying constant current to the windings of the motor to control the motor. In the constant current control, neither the phase feedback control nor the speed feedback control is performed.

The CPU 151$a$ supplies the instruction phase θ_ref to the constant current controller 517. The constant current controller 517 generates current instruction values iα_ref and iβ_ref in the stationary coordinate system, which correspond to the instruction phase θ_ref supplied from the CPU 151$a$, and outputs the generated current instruction values iα_ref and iβ_ref.

Then, the current detectors 507 and 508 detect the driving current flowing through the windings of the A phase and the B phase of the motor 509. The detected driving current is converted from an analog value to a digital value in the A/D converter 510 and is represented as the current values iα and iβ, as in Equations (1) and (2). The difference between the current value iα and the current instruction value iα_ref and the difference between the current value iβ and the current instruction value iβ_ref are input into the current controller 503. The current controller 503 outputs the driving voltages Vα and Vβ so that the differences are decreased. Specifically, the current controller 503 outputs the driving voltages Vα and Vβ so that each of the differences comes close to zero. The driving voltages Vα and Vβ output from the current controller 503 are supplied to the PWM inverter 506. The PWM inverter 506 supplies the driving current to the winding of each phase of the motor 509 using the method described above to drive the motor 509.

The constant current control has been described above.

[Switching Between Vector Control and Constant Current Control]

In the vector control in the present embodiment, the rotation phase of the rotor is determined based on the magnitude of the induced voltage occurring at the winding of each phase of the motor. The magnitude of the induced voltage occurring at the winding is decreased with the decreasing rotation speed of the rotor. When the magnitude of the induced voltage occurring at the winding is not sufficient for determination of the rotation phase of the rotor, the rotation phase may not be accurately determined. In other words, the difference between the actual rotation phase of the rotor and the determined rotation phase of the rotor may be increased with the decreasing rotation speed of the rotor. When the difference between the actual rotation phase of the rotor and the determined rotation phase of the rotor is large, the control of the motor is made unstable when the motor is controlled based on the determined rotation phase of the rotor.

In such a case, a configuration may be considered in which the constant current control is performed when the rotation speed of the rotor is lower than a certain rotation speed and the vector control is performed when the rotation speed of the rotor is higher than or equal to the certain rotation speed.

However, in switching of the control of the motor from the constant current control to the vector control, the rotation speed of the motor may instantaneously decrease. This is because the magnitude of the torque that has occurred at the rotor due to the driving current that has been first supplied to the winding after the switching of the control of the motor may be smaller than the magnitude of the torque that has occurred at the rotor due to the driving current that has been last supplied to the winding before the switching of the control of the motor.

Accordingly, even when the rotation speed of the rotor exceeds a certain rotation speed and the control of the motor is switched from the constant current control to the vector control, the rotation speed of the motor immediately after the control of the motor is switched is decreased to a value lower than the certain rotation speed. As a result, the control of the motor is switched again from the vector control to the constant current control. The switching between the constant current control and the vector control frequently occurs in the above manner. As a result, an increase and a decrease in the motor sound may repeatedly occur or the motor may be put into the out-of-control state. Also when the control of the motor is switched from the vector control to the constant current control, the rotation speed of the motor may instantaneously increase or decrease.

Accordingly, the following configuration is applied to the motor control apparatus in the present embodiment.

[Method of Switching Control in the Present Embodiment]

Figure 5:
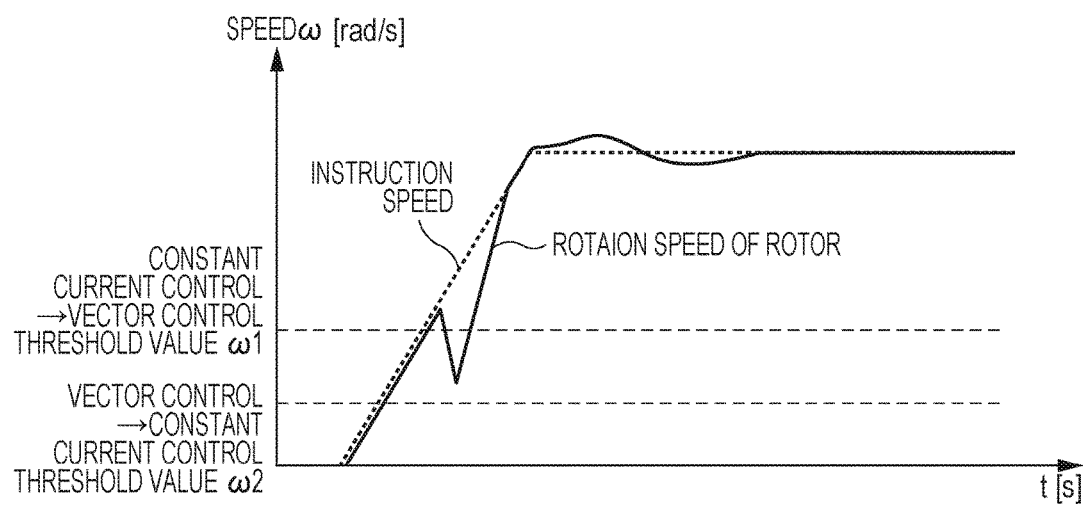
FIG. 5 is a graph illustrating the relationship between threshold values used to switch between constant current control and vector control and a rotation speed and an instruction speed of a rotor of a motor in an embodiment of the subject disclosure.

FIG. 5 is a graph illustrating the relationship between threshold values used to switch between the constant current control and the vector control and the rotation speed and the instruction speed of the rotor 402. In the present embodiment, as illustrated in FIG. 5, two threshold values are provided for the rotation speed of the rotor to switch between the constant current control and the vector control. Specifically, a threshold value of as a first threshold value, which is a threshold value for switching the control of the motor from the constant current control to the vector control and a threshold value ω2 as a second threshold value, which is a threshold value for switching the control of the motor from the vector control to the constant current control are set in the present embodiment. The threshold value ω1 is set so as to be higher than the threshold value ω2 (ω1>ω2). The threshold values ω1 and ω2 will now be described. The instruction speed illustrated in FIG. 5 is an example in the present embodiment and the instruction speed is not limited to this.

The threshold value ω2 is set to a rotation speed of the rotor for which the accuracy in determining the rotation phase θ by the phase determiner 513 is ensured. In the present embodiment, the threshold value ω2 is set to the lowest rotation speed, among the rotation speeds of the rotor for which the accuracy in determining the rotation phase θ by the phase determiner 513 is ensured. In other words, the threshold value ω2 is set to the rotation speed at which minimal induced voltage occurs to accurately determine the rotation phase θ of the rotor 402 by the phase determiner 513. As a result, even if the rotation speed decreases in the state in which the vector control is being performed, the motor control apparatus 157 is capable of continuing the vector control to the extent possible. In other words, it is possible to inhibit the motor 509 from being put into the step-out state and to suppress an increase in motor sound and an increase in power consumption, which are caused by excess torque, to the extent possible.

As described above, in switching of the control of the motor from the constant current control to the vector control, the rotation speed of the motor may instantaneously decrease. Accordingly, the threshold value ω1 is set in consideration of the magnitude of the rotation speed, which instantaneously decreases in switching of the control of the motor from the constant current control to the vector control. Specifically, the threshold value ω1 is set so that the rotation speed is not decreased to a value lower than the threshold value ω2 even if the rotation speed of the rotor 402 instantaneously decreases when the rotation speed of the rotor 402 is increased to a value exceeding the threshold value ω1 and the control of the motor is switched from the constant current control to the vector control. In the present embodiment, the threshold value ω1 is set to the lowest value, among the rotation speeds that are not lower than the threshold value ω2 even if the rotation speed of the rotor 402 instantaneously decreases when the control of the motor is switched from the constant current control to the vector control. As a result, it is possible to shorten the period during which the constant current control is performed to the extent possible and to switch the control of the motor from the constant current control to the vector control as quickly as possible. In other words, it is possible to inhibit the motor 509 from being put into the step-out state and to suppress an increase in motor sound and an increase in power consumption, which are caused by excess torque, to the extent possible.

Setting the threshold values ω1 and ω2 in the above manner allows the motor control apparatus 157 to continue the vector control even if the rotation speed instantaneously decreases in switching of the control of the motor from the constant current control to the vector control. In other words, it is possible to inhibit the switching between the constant current control and the vector control from repeatedly occurring. In addition, it is possible to inhibit the motor 509 from being put into the step-out state and to suppress an increase in motor sound and an increase in power consumption, which are caused by excess torque, to the extent possible.

A method of switching between the constant current control and the vector control by the motor control apparatus 157 will now be described with reference to FIG. 4. As illustrated in FIG. 4, the motor control apparatus 157 in the present embodiment includes the speed determiner 514, the control selector 515, and the control selector switches 516a, 516b, and 516c (hereinafter referred to as switches) as the components for switching between the constant current control and the vector control.

The speed determiner 514 determines a rotation speed ω of the rotor 402 based on variation in time in the rotation phase θ supplied from the phase determiner 513. Equation (10) is used to determine the rotation speed ω:

$$\omega = d\theta/dt \qquad (10)$$

The speed determiner 514 supplies the determined rotation speed ω to the control selector 515.

The control selector 515 switches between the constant current control and the vector control based on the rotation speed ω supplied from the speed determiner 514. The switching between the constant current control and the vector control will now be described in detail. In the present embodiment, a circuit for determining the rotation speed ω of the rotor of the motor (the induced voltage determiner 512, the phase determiner 513, the speed determiner 514, and so on) is activated also during a period in which the constant current control is being performed.

If the rotation speed ω is higher than or equal to the threshold value ω1 (ω≥ω1) during the control by the constant current controller 517, the control selector 515 switches the controller used for controlling the driving of the motor 509. Specifically, the control selector 515 controls the state of each of the switches 516a, 516b, and 516c so that the controller used for controlling the driving of the motor 509 is switched from the constant current controller 517 to the vector controller 518. As a result, the vector control by the vector controller 518 is performed.

If the rotation speed ω is lower than the threshold value ω1 (ω<ω1) during the control by the constant current controller 517, the control selector 515 does not switch the controller used for controlling the driving of the motor 509. Specifically, the control selector 515 controls the state of each of the switches 516a, 516b, and 516c so that the state in which the driving of the motor 509 is controlled by the motor control apparatus 157 is kept. As a result, the constant current control by the constant current controller 517 is continued.

If the rotation speed ω is lower than the threshold value ω2 (ω<ω2) during the control by the vector controller 518, the control selector 515 switches the controller used for controlling the driving of the motor 509. Specifically, the control selector 515 controls the state of each of the switches 516a, 516b, and 516c so that the controller used for controlling the driving of the motor 509 is switched from the vector controller 518 to the constant current controller 517. As a result, the constant current control by the constant current controller 517 is performed.

If the rotation speed ω is higher than or equal to the threshold value ω2 (ω≥ω2) during the control by the vector controller 518, the control selector 515 does not switch the controller used for controlling the driving of the motor 509. Specifically, the control selector 515 controls the state of each of the switches 516a, 516b, and 516c so that the state in which the driving of the motor 509 is controlled by the vector controller 518 is kept. As a result, the vector control by the vector controller 518 is continued.

Figure 6:
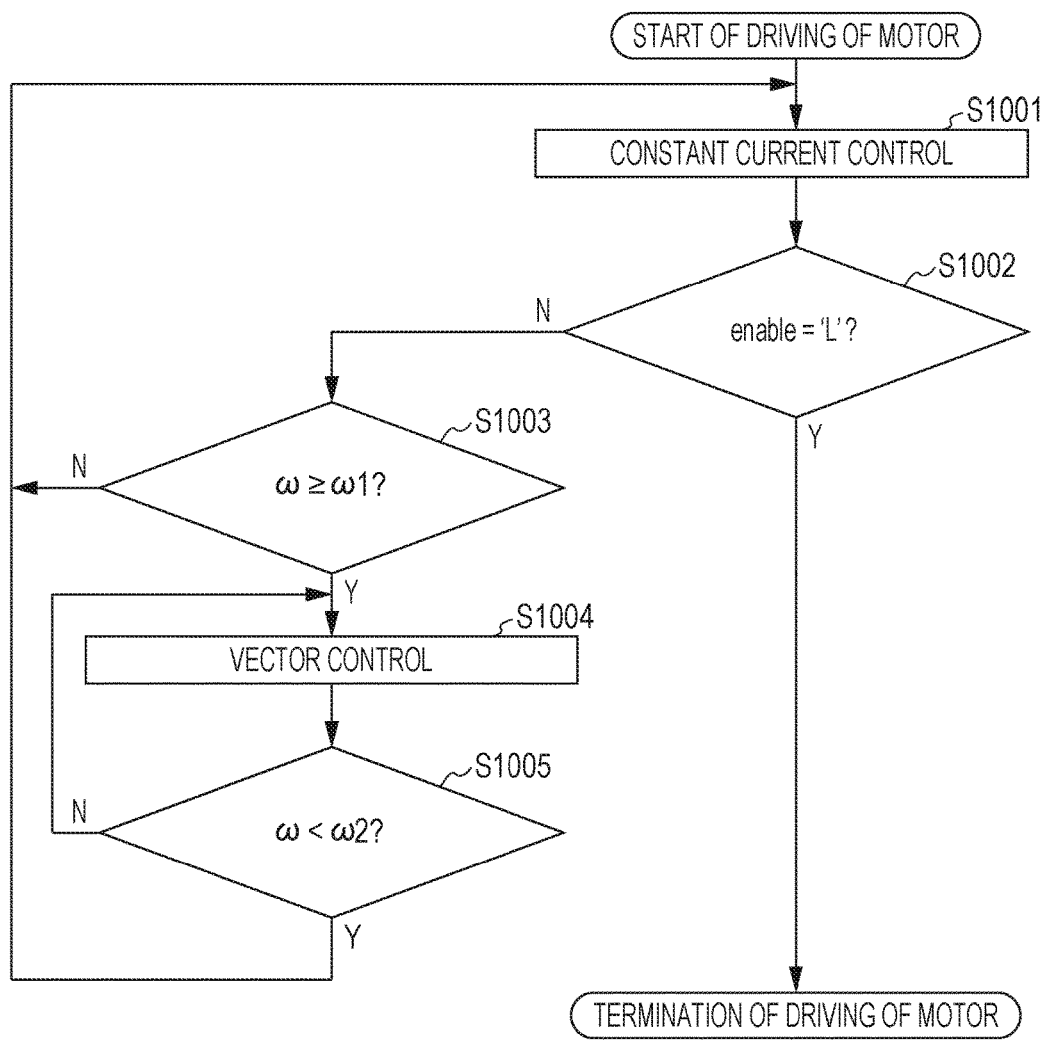
FIG. 6 is a flowchart illustrating an exemplary method of controlling the motor in an embodiment of the subject disclosure.

FIG. 6 is a flowchart illustrating an exemplary method of controlling the motor by the motor control apparatus 157. A process of controlling the motor 509 in the present embodiment will now be described with reference to FIG. 6. The process in the flowchart in FIG. 6 is performed by the motor control apparatus 157 in response to an instruction from the CPU 151a.

Upon supply of an enable signal 'H' from the CPU 151a to the motor control apparatus 157, the motor control apparatus 157 starts driving of the motor 509 based on an instruction supplied from the CPU 151a. The enable signal is a signal to permit or inhibit the activation of the motor control apparatus 157. If the enable signal is set to an 'L (low level)', the CPU 151a inhibits the activation of the motor control apparatus 157. In other words, the control of the motor 509 by the motor control apparatus 157 is terminated. If the enable signal is set to a 'H (high level)', the CPU 151a permits the activation of the motor control apparatus 157 and the motor control apparatus 157 controls the motor 509 based on an instruction supplied from the CPU 151a.

Referring to FIG. 6, in Step S1001, the control selector 515 controls the state of each of the switches 516a, 516b, and 516c so that the driving of the motor 509 is controlled by the constant current controller 517. As a result, the constant current control by the constant current controller 517 is performed.

In Step S1002, it is determined whether the CPU 151a supplies the enable signal 'L' to the motor control apparatus 157. If the CPU 151a supplies the enable signal 'L' to the motor control apparatus 157 (YES in Step S1002), the motor control apparatus 157 terminates the driving of the motor 509. If the CPU 151a supplies the enable signal 'H' to the motor control apparatus 157 (NO in Step S1002), the process goes to Step S1003.

In Step S1003, it is determined whether the rotation speed ω of the rotor 402 is higher than or equal to the threshold value ω1. If the rotation speed ω of the rotor 402 is lower than the threshold value ω1 (NO in Step S1003), the process goes back to Step S1001 and the constant current control by the constant current controller 517 is continued.

If the rotation speed ω of the rotor 402 is higher than or equal to the threshold value ω1 (YES in Step S1003), in Step S1004, the control selector 515 switches the controller used for controlling the driving of the motor 509. Specifically, the control selector 515 controls the state of each of the switches 516a, 516b, and 516c so that the controller used for controlling the driving of the motor 509 is switched from the constant current controller 517 to the vector controller 518. As a result, the vector control by the vector controller 518 is performed.

In Step S1005, it is determined whether the rotation speed ω of the rotor 402 is lower the threshold value ω2. If the rotation speed ω of the rotor 402 is higher than or equal to the threshold value ω2 (NO in Step S1005), the process goes back to Step S1004 and the vector control by the vector controller 518 is continued.

If the rotation speed ω of the rotor 402 is lower than the threshold value ω2 (YES in Step S1005), the process goes back to Step S1001 and the control selector 515 switches the controller used for controlling the driving of the motor 509. Specifically, the control selector 515 controls the state of each of the switches 516a, 516b, and 516c so that the controller used for controlling the driving of the motor 509 is switched from the vector controller 518 to the constant current controller 517. As a result, the constant current control by the constant current controller 517 is performed.

The motor control apparatus 157 repeats the above control until the CPU 151a supplies the enable signal 'L' to the motor control apparatus 157.

As described above, the threshold values for the rotation speed of the rotor, which are used for switching between the constant current control and the vector control, are set so that ω1>ω2 in the present embodiment. The threshold value ω2 is set to the rotation speed of the rotor at which the accuracy in determining the rotation phase θ by the phase determiner 513 is ensured. The threshold value ω1 is set in consideration of the magnitude of the rotation speed of the rotor 402, which instantaneously decreases in switching of the control of the motor from the constant current control to the vector control.

In addition, the switching between the constant current control and the vector control is performed based on comparison between the rotation speed ω of the rotor and the threshold values ω1 and ω2 in the present embodiment. Specifically, when the rotation speed ω1 is varied from a value lower than the threshold value Ω1 to a value higher than or equal to the threshold value ω1 in a state in which the constant current control is being performed, the motor control apparatus 157 switches the control of the motor from the constant current control to the vector control. When the rotation speed ω is varied from a value higher than or equal to the threshold value ω1 to a value that is lower than the threshold value ω1 and that is higher than or equal to the threshold value ω2 in a state in which the vector control is being performed, the motor control apparatus 157 does not switch the control of the motor. When the rotation speed ω is decreased and is varied from a value higher than or equal to the threshold value ω2 to a value lower than the threshold value ω2, the motor control apparatus 157 switches the control of the motor from the vector control to the constant current control. As a result, it is possible to inhibit the switching between the constant current control and the vector control from repeatedly occurring. Specifically, it is possible to suppress repetition of an increase and a decrease in the motor sound and to inhibit the motor from being put into the out-of-control state.

As described above, the threshold value ω2 is set to the rotation speed of the rotor at which the accuracy in determining the rotation phase θ by the phase determiner 513 is ensured. Accordingly, the speed determiner 514 is capable of accurately determining the rotation speed ω of the rotor if the rotation speed ω is higher than or equal to the threshold value ω2. Consequently, the motor control apparatus 157 is capable of performing the switching from the constant current control to the vector control and the switching from the vector control to the constant current control based on the rotation speed ω. The use of the rotation speed ω enables the switching of the control to be more appropriately performed, compared with a case in which an instruction speed ω_ref is used.

Although the rotation speed ω of the rotor 402 is calculated using Equation (10) in the present embodiment, the calculation of the rotation speed ω of the rotor 402 is not limited to this. For example, the rotation speed ω may be estimated based on a period in which the magnitude of a periodic signal correlated to the rotation period of the rotor 402 is zero, such as the driving current flowing through the winding of the A phase (or the B phase) of the motor 509, the driving voltage of the A phase (or the B phase), or the induced voltage occurring at the winding of the A phase (or the B phase).

Although the circuit for the vector control is partially shared with the circuit for the constant current control (for example, the current controller 503 and the PWM inverter 506) in the motor control apparatus in the present embodiment, the configuration of the motor control apparatus is not limited to this. Specifically, a configuration may be used in which the circuit for the vector control and the circuit for the constant current control are independently provided.

Although the stepping motor is used as the motor that drives the loads in the present embodiment, another motor, such as a direct-current (DC) motor, may be used. The motor is not limited to the two-phase motor and may be another motor, such as a three-phase motor.

Figure 7:
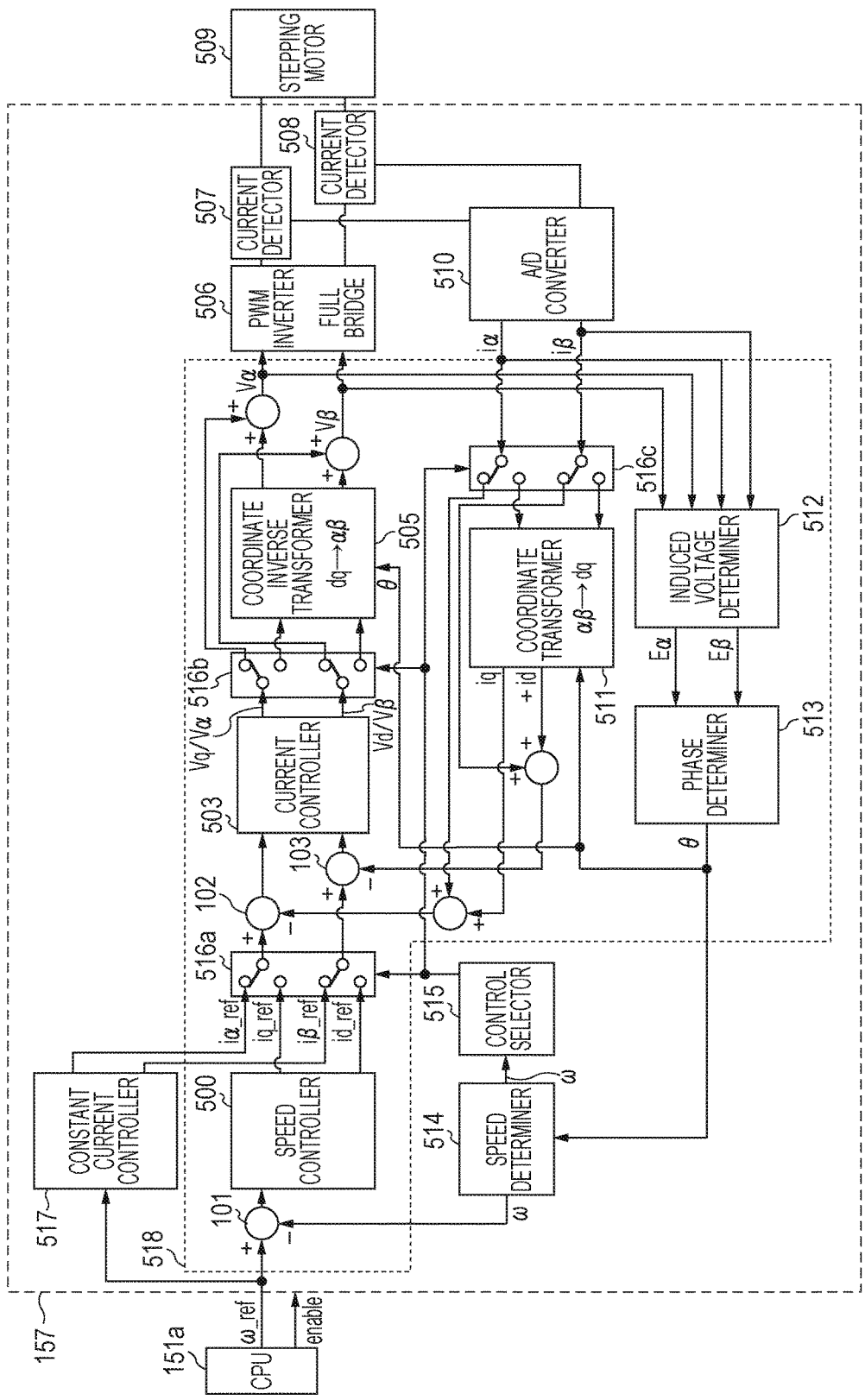
FIG. 7 is a block diagram illustrating an exemplary configuration of a motor control apparatus performing speed feedback control according to an embodiment of the subject disclosure.

Although the motor 509 is controlled using the phase feedback control in the motor control apparatus in the present embodiment, the control of the motor 509 is not limited to this. For example, the motor control apparatus may have a configuration in which the rotation speed ω of the rotor 402 is fed back to control the motor 509. Specifically, as illustrated in FIG. 7, a speed controller 500 provided in the motor control apparatus generates the q-axis current instruction value iq_ref and the d-axis current instruction value id_ref so that the difference between the instruction speed ω_ref indicating the target speed of the rotor, which is supplied from the CPU 151a, and the rotation speed ω is decreased and outputs the generated q-axis current instruction value iq_ref and d-axis current instruction value id_ref. A configuration may be used in which such speed feedback control is performed to control the motor 509. Since the rotation speed is fed back in such a configuration, the rotation speed of the rotor is controlled so as to be a certain speed. Accordingly, application of the vector control using the speed feedback control to the motor that drives the loads (for example, the photoconductive drum and the conveying belt) required to set the rotation speed of the rotor to a constant speed in the image forming apparatus enables the image formation on the recording medium to be appropriately performed.

A first control circuit in the present embodiment corresponds to a circuit that controls the driving of the motor 509 using the vector controller 518. A second control circuit in the present embodiment corresponds to a circuit that controls the driving of the motor 509 using the constant current controller 517.

According to the present disclosure, it is possible to suppress repetition of switching between a first control mode and a second control mode, which are control modes for controlling a motor.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-069289 filed Mar. 30, 2016 and No. 2017-035390 filed Feb. 27, 2017, which are hereby incorporated by reference herein in their entirety.

What is claimed is:

1. A motor control apparatus that controls a motor based on an instruction phase indicating a target phase of a rotor of the motor, the motor control apparatus comprising:
   a current detector configured to detect driving current flowing in a winding of the motor;
   a phase determiner configured to determine a rotation phase of the rotor based on the driving current detected by the current detector;
   a speed determiner configured to determine a rotation speed of the rotor; and
   a controller having (i) a first control mode in which the driving current is controlled, so that a difference between a value of a torque current component of the driving current detected by the current detector and a target value of the torque current component is decreased, to control the motor, the target value of the torque current component being set so that a difference between the instruction phase and the rotation phase determined by the phase determiner is decreased and the torque current component being a current component, which generates torque in the rotor, represented in a rotating coordinate system based on the rotation phase, and (ii) a second control mode in which constant current is supplied to a winding of the motor to control the motor,
   wherein the controller is configured to start driving the motor in the second control mode,
   wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, and
   wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value being lower than the first threshold value.

2. The motor control apparatus according to claim 1,
   wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

3. The motor control apparatus according to claim 2,
   wherein the controller includes:
   a first control circuit that supplies driving current to a winding of a first phase of the motor and driving current to a winding of a second phase thereof when the first control mode is performed,
   a second control circuit that supplies driving current to the winding of the first phase of the motor and driving current to the winding of the second phase of the motor when the second control mode is performed, and
   a switcher that switches between control of the motor using the first control circuit and control of the motor using the second control circuit based on the rotation speed determined by the speed determiner.

4. The motor control apparatus according to claim 3,
   wherein the speed determiner determines the rotation speed of the rotor based on variation in time of the rotation phase determined by the phase determiner.

5. The motor control apparatus according to claim 4,
   wherein the controller includes:
   a current provider that supplies the driving current to the winding of the first phase of the motor and the driving current to the winding of the second phase of the motor,
   a generator that generates driving voltage to drive the current provider,
   an induced voltage determiner that determines a magnitude of induced voltage induced in the winding of the first phase and a magnitude of induced voltage induced in the winding of the second phase in response to rotation of the rotor of the motor based on the driving voltage generated by the generator and the driving current detected by the current detector, and
   wherein the phase determiner determines the rotation phase of the rotor based on the magnitude of the induced voltage of the first phase and the magnitude of the induced voltage of the second phase, which are determined by the induced voltage determiner.

6. The motor control apparatus according to claim 5,
   wherein the controller controls a value of an excitation current component so as to be zero, the excitation current component being a current component, which affects a strength of a magnetic flux through the winding of the motor, represented in a rotating coordinate system.

7. A motor control apparatus that controls a motor based on an instruction speed indicating a target speed of a rotor of the motor, the motor control apparatus comprising:
   a current detector configured to detect driving current flowing in a winding of the motor;
   a phase determiner configured to determine a rotation phase of the rotor based on the driving current detected by the current detector;

a speed determiner configured to determine a rotation speed of the rotor; and a controller having (i) a first control mode in which the driving current is controlled, so that a difference between a value of a torque current component of the driving current detected by the current detector and a target value of the torque current component is decreased, to control the motor, the target value of the torque current component being set so that a difference between the instruction speed and the rotation speed determined by the speed determiner is decreased and the torque current component being a current component, which generates torque in the rotor, represented in a rotating coordinate system based on the rotation phase, and (ii) a second control mode in which constant current is supplied to a winding of the motor to control the motor, wherein the controller is configured to start driving the motor in the second control mode, wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, and wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value is lower than the first threshold value.

8. The motor control apparatus according to claim 7, wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

9. The motor control apparatus according to claim 8, wherein the controller includes:

a first control circuit that supplies driving current to a winding of a first phase of the motor and driving current to a winding of a second phase of the motor when the first control mode is performed, a second control circuit that supplies driving current to the winding of the first phase of the motor and driving current to the winding of the second phase of the motor when the second control mode is performed, and a switcher that switches between control of the motor using the first control circuit and control of the motor using the second control circuit based on the rotation speed determined by the speed determiner.

10. The motor control apparatus according to claim 9, wherein the speed determiner determines the rotation speed of the rotor based on variation in time of the rotation phase determined by the phase determiner.

11. A sheet conveying apparatus comprising:

a conveying roller configured to convey a sheet;

a motor configured to drive the conveying roller;

a current detector configured to detect driving current flowing in a winding of the motor;

a phase determiner configured to determine a rotation phase of a rotor of the motor based on the driving current detected by the current detector;

a speed determiner configured to determine a rotation speed of the rotor; and a controller having (i) a first control mode in which the driving current is controlled, so that a difference between a value of a torque current component of the driving current detected by the current detector and a target value of the torque current component is decreased, to control the motor, the target value of the torque current component being set so that a difference between an instruction phase indicating a target phase of the rotor and the rotation phase determined by the phase determiner is decreased and the torque current component being a current component, which generates torque in the rotor, represented in a rotating coordinate system based on the rotation phase, and (ii) a second control mode in which constant current is supplied to a winding of the motor to control the motor, wherein the controller is configured to start driving the motor in the second control mode, wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value is lower than the first threshold value, and wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

12. A document feeding apparatus comprising:

a document tray in which an original document is loaded;

a conveying roller configured to convey the original document loaded in the document tray;

a motor configured to drive the conveying roller;

a current detector configured to detect driving current flowing in a winding of the motor;

a phase determiner configured to determine a rotation phase of a rotor of the motor based on the driving current detected by the current detector;

a speed determiner configured to determine a rotation speed of the rotor; and a controller having (i) a first control mode in which the driving current is controlled, so that a difference between a value of a torque current component of the driving current detected by the current detector and a target value of the torque current component is decreased, to control the motor, the target value of the torque current component being set so that a difference between an instruction phase indicating a target phase of the rotor and the rotation phase determined by the phase determiner is decreased the torque current component being a current component, which generates torque in the rotor, represented in a rotating coordinate system based on the rotation phase, and (ii) a second control mode in which constant current is supplied to a winding of the motor to control the motor, wherein the controller is configured to start driving the motor in the second control mode, wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value is lower than the first threshold value, and wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

13. A document reading apparatus comprising:

a document tray in which an original document is loaded;

a conveying roller configured to convey the original document loaded in the document tray;

a reading unit configured to read the original document conveyed by the conveying roller;

a motor configured to drive the conveying roller;

a current detector configured to detect driving current flowing in a winding of the motor;

a phase determiner configured to determine a rotation phase of a rotor of the motor based on the driving current detected by the current detector;

a speed determiner configured to determine a rotation speed of the rotor; and a controller having (i) a first control mode in which the driving current is controlled, so that a difference between a value of a torque current component of the driving current detected by the current detector and a target value of the torque current component is decreased, to control the motor, the target value of the torque current component being set so that a difference between an instruction phase indicating a target phase of the rotor and the rotation phase determined by the phase determiner is decreased and the torque current component being a current component, which generates torque in the rotor, represented in a rotating coordinate system based on the rotation phase, and (ii) a second control mode in which constant current is supplied to a winding of the motor to control the motor, wherein the controller is configured to start driving the motor in the second control mode, wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, wherein the controller keeps the first control mode even if the rotation speed of the rotor determined by the speed determiner is varied from a value higher than or equal to the first threshold value to a value that is higher than or equal to a second threshold value and that is lower than the first threshold value in a state in which the motor is controlled in the first control mode, the second threshold value is lower than the first threshold value, and wherein the controller switches the control mode to control the motor from the first control mode to the second control mode if the rotation speed of the rotor of the motor determined by the speed determiner is varied from a value higher than or equal to the second threshold value to a value lower than the second threshold value in the state in which the motor is controlled in the first control mode.

14. An image forming apparatus comprising:

a conveying roller configured to convey a recording medium;

an image forming unit configured to form an image on the recording medium conveyed by the conveying roller;

a motor configured to drive the conveying roller;

a current detector configured to detect driving current flowing in a winding of the motor;

a phase determiner configured to determine a rotation phase of a rotor of the motor based on the driving current detected by the current detector;

a speed determiner configured to determine a rotation speed of the rotor; and a controller having (i) a first control mode in which the driving current is controlled, so that a difference between a value of a torque current component of the driving current detected by the current detector and a target value of the torque current component is decreased, to control the motor, the target value of the torque current component being set so that a difference between an instruction phase indicating a target phase of the rotor and the rotation phase determined by the phase determiner is decreased and the torque current component being a current component, which generates torque in the rotor, represented in a rotating coordinate system based on the rotation phase, and (ii) a second control mode in which constant current is supplied to a winding of the motor to control the motor, wherein the controller is configured to start driving the motor in the second control mode, wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode, wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value is lower than the first threshold value, and wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

15. An image forming apparatus that forms an image on a recording medium, the image forming apparatus comprising:
an image forming unit configured to form an image on the recording medium;
a motor configured to drive a load;
a current detector configured to detect driving current flowing in a winding of the motor;
a phase determiner configured to determine a rotation phase of a rotor of the motor based on the driving current detected by the current detector;
a speed determiner configured to determine a rotation speed of the rotor; and
a controller having (i) a first control mode in which the driving current is controlled, so that a difference between a value of a torque current component of the driving current detected by the current detector and a target value of the torque current component is decreased, to control the motor, the target value of the torque current component being set so that a difference between an instruction phase indicating a target phase of the rotor and the rotation phase determined by the phase determiner is decreased and the torque current component being a current component, which generates torque in the rotor, represented in a rotating coordinate system based on the rotation phase, and (ii) a second control mode in which constant current is supplied to a winding of the motor to control the motor,
wherein the controller is configured to start driving the motor in the second control mode,
wherein the controller switches a control mode to control the motor from the second control mode to the first control mode if the rotation speed of the rotor determined by the speed determiner is varied from a value lower than a first threshold value to a value higher than or equal to the first threshold value in a state in which the motor is controlled in the second control mode,
wherein the controller keeps the first control mode even if the rotation speed of the rotor determined by the speed determiner is varied from a value higher than or equal to the first threshold value to a value that is higher than or equal to a second threshold value and is lower than the first threshold value in a state in which the motor is controlled in the first control mode, the second threshold value is lower than the first threshold value, and
wherein the controller switches the control mode to control the motor from the first control mode to the second control mode if the rotation speed of the rotor determined by the speed determiner is varied from a value higher than or equal to the second threshold value to a value lower than the second threshold value in the state in which the motor is controlled in the first control mode.

16. The image forming apparatus according to claim 15, wherein the load is a conveying roller that conveys the recording medium.

17. The image forming apparatus according to claim 15, wherein the image forming unit includes a transfer unit configured to transfer the image to the recording medium at a transfer position,
wherein the image forming apparatus further includes a registration roller configured to convey the recording medium to the transfer position in synchronization with a timing of when the transfer unit transfers the image to the recording medium, and
wherein the load is the registration roller.

18. The motor control apparatus according to claim 1, wherein the motor is a stepping motor.

19. The motor control apparatus according to claim 1, wherein a difference value between the first threshold value and the second threshold value is higher than a value corresponding to decrement of the rotation speed of the rotor, the decrement being due to switching the control mode from the second control mode to the first control mode.

20. The motor control apparatus according to claim 7, wherein the motor is a stepping motor.

21. The motor control apparatus according to claim 7, wherein a difference value between the first threshold value and the second threshold value is higher than a value corresponding to decrement of the rotation speed of the rotor, the decrement being due to switching the control mode from the second control mode to the first control mode.

22. The sheet conveying apparatus according to claim 11, wherein the motor is a stepping motor.

23. The sheet conveying apparatus according to claim 11, wherein a difference value between the first threshold value and the second threshold value is higher than a value corresponding to decrement of the rotation speed of the rotor, the decrement being due to switching the control mode from the second control mode to the first control mode.

* * * * *